Aug. 4, 1931.  A. JORDAHL  1,816,854
FILTER APPARATUS
Filed May 6, 1926    5 Sheets-Sheet 1

INVENTOR
Anders Jordahl
BY C. P. Goepel
his ATTORNEY

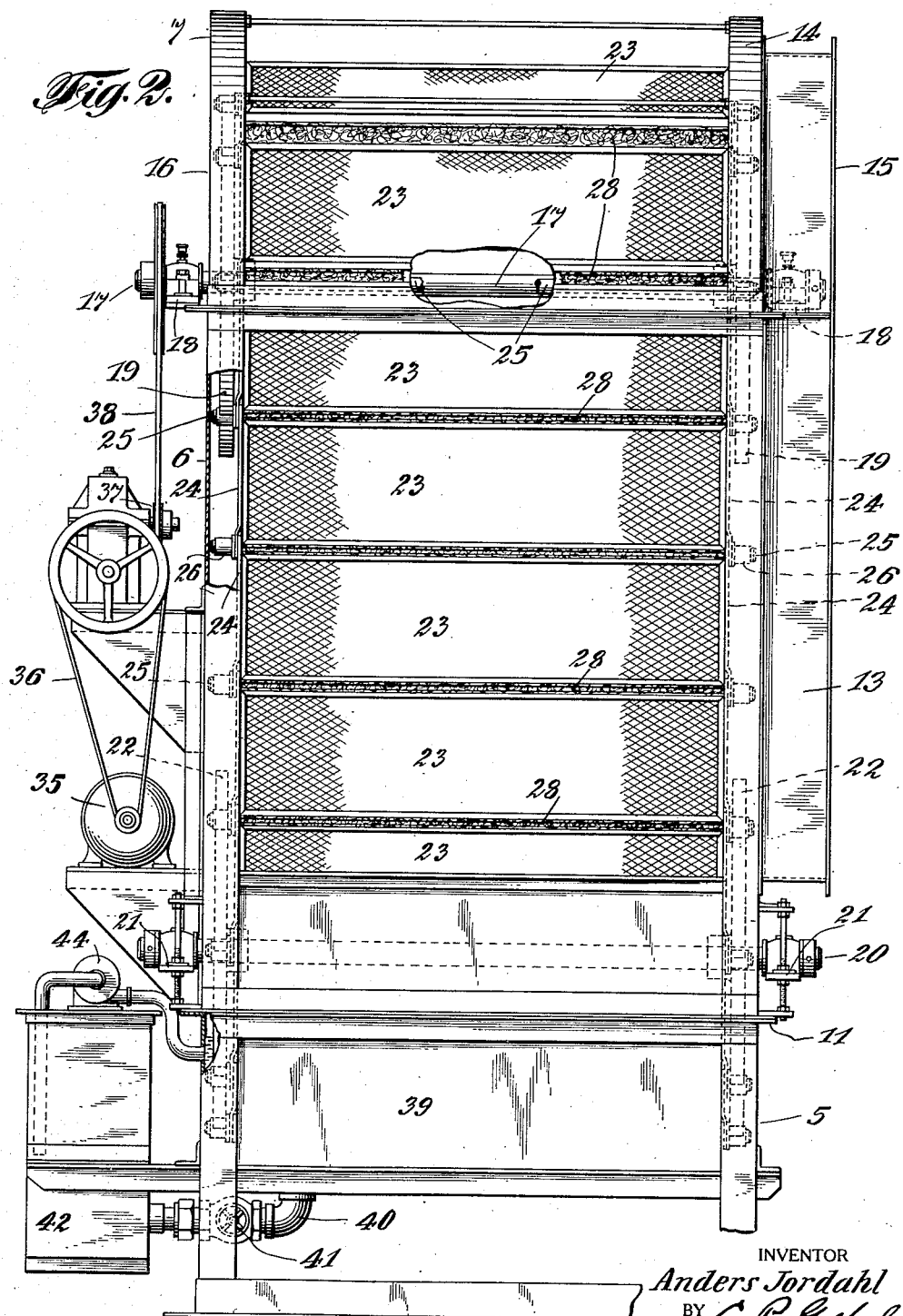

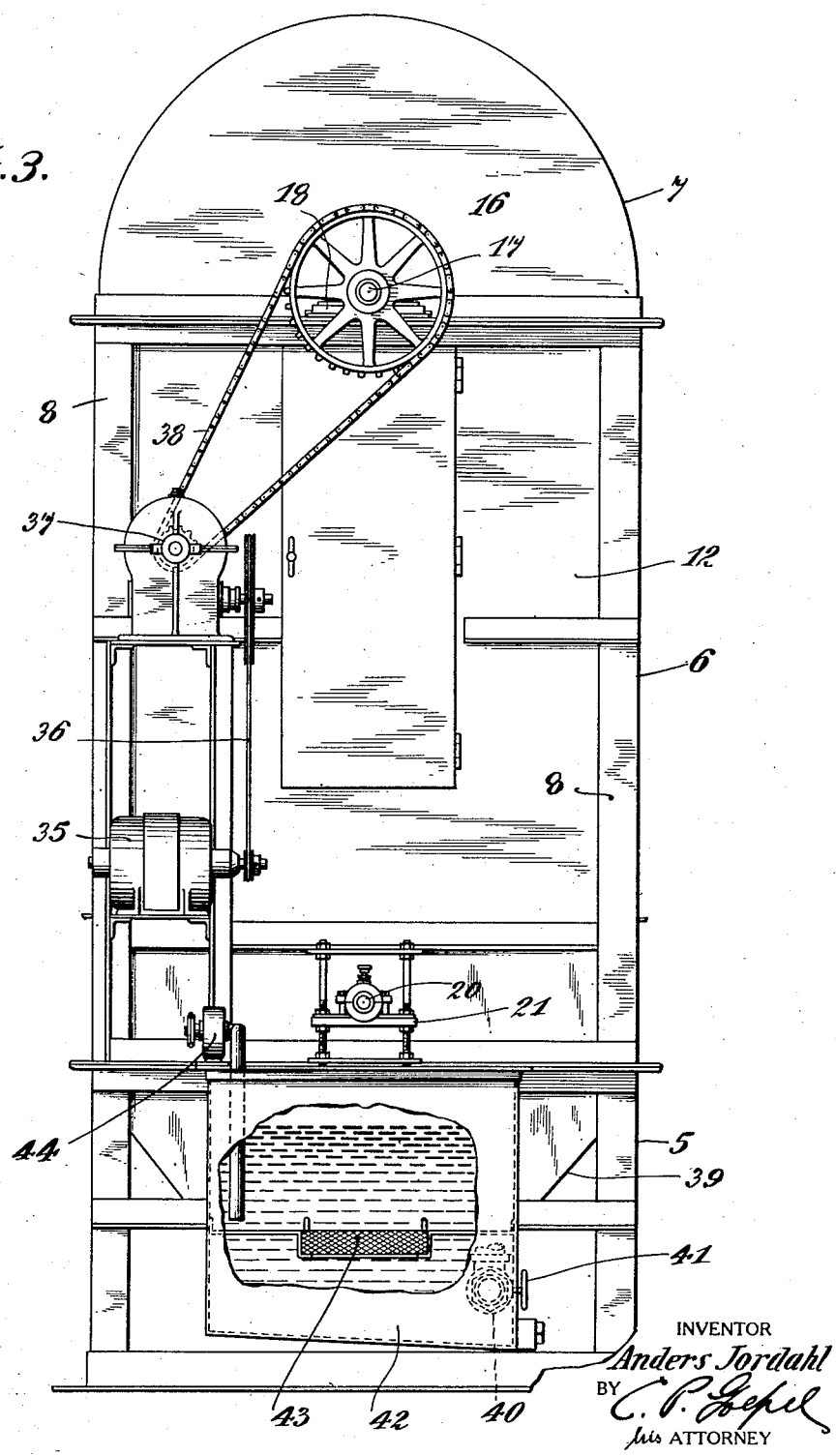

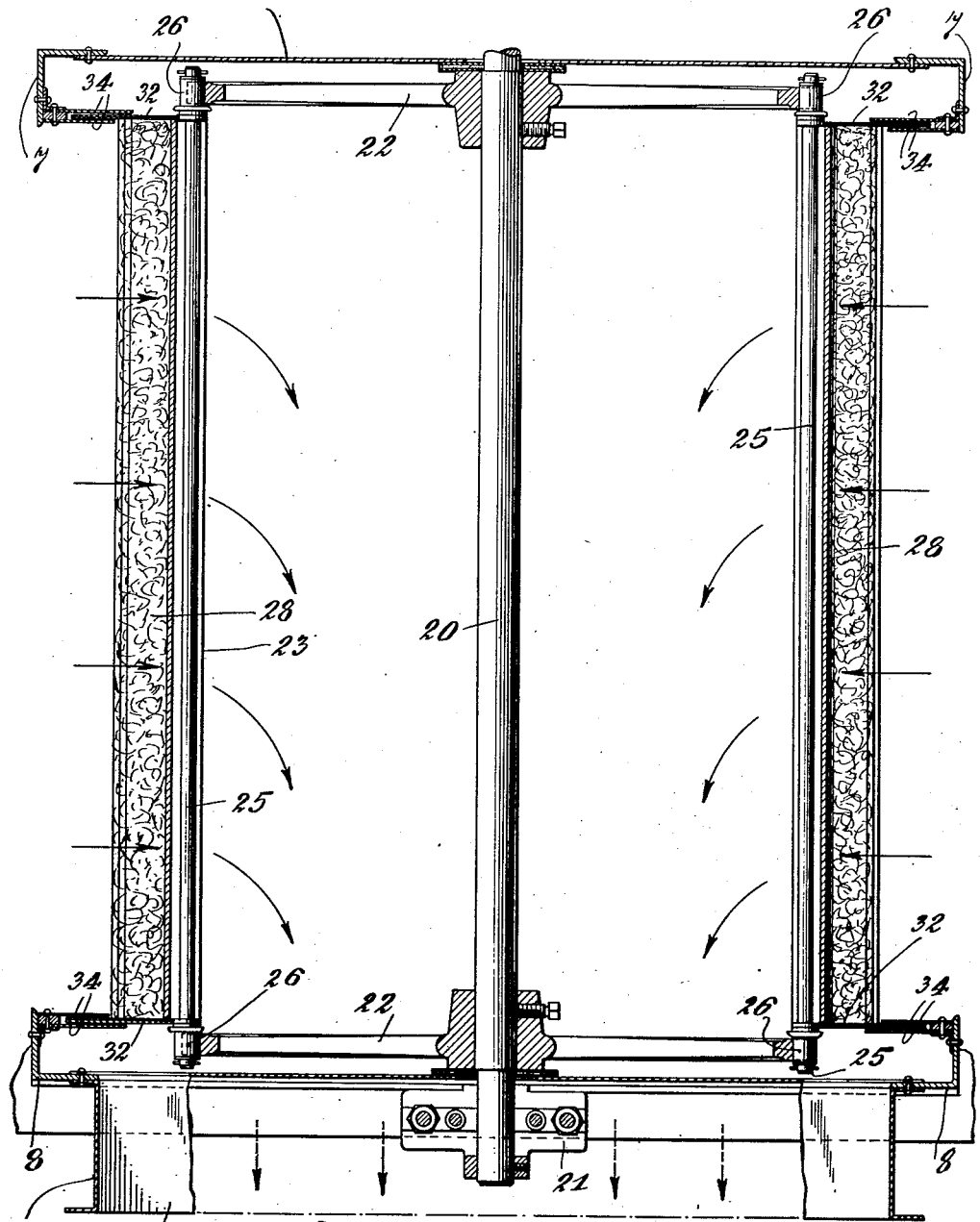

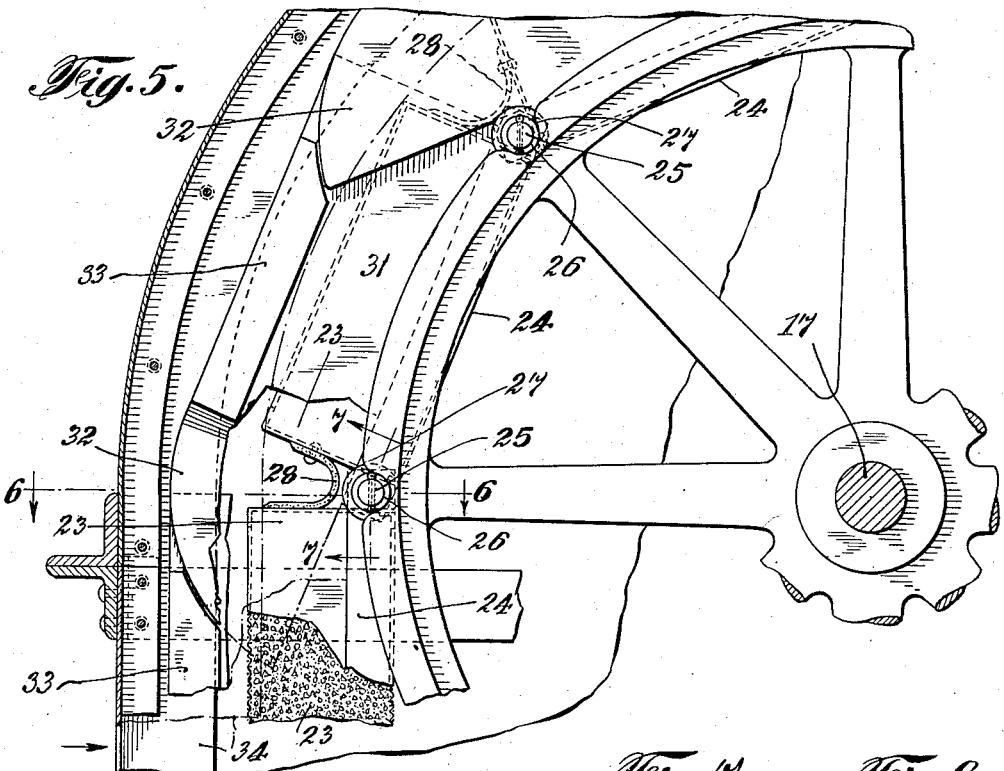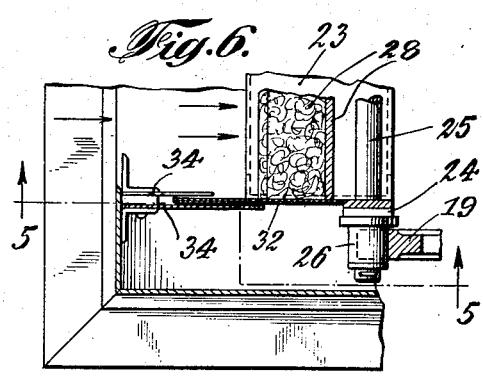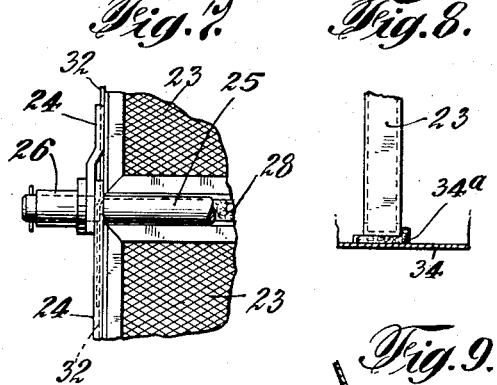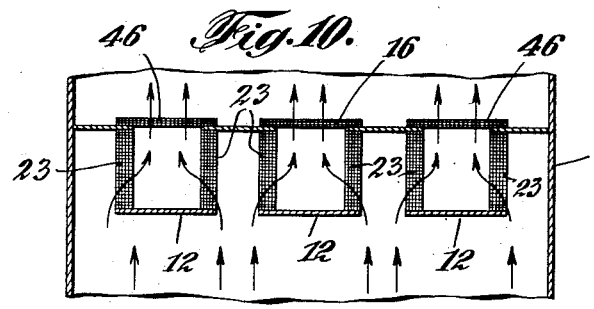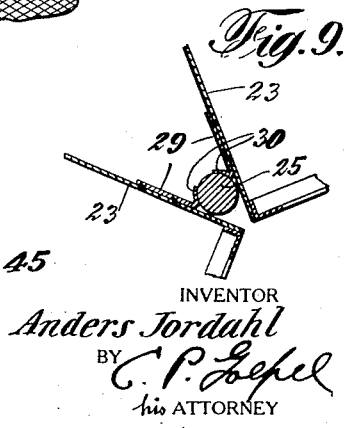

Patented Aug. 4, 1931

1,816,854

UNITED STATES PATENT OFFICE

ANDERS JORDAHL, OF NEW YORK, N. Y., ASSIGNOR TO AMERICAN AIR FILTER COMPANY, INC., OF LOUISVILLE, KENTUCKY, A CORPORATION OF DELAWARE

FILTER APPARATUS

Application filed May 6, 1926. Serial No. 107,118.

This invention relates to filter apparatus, and has for its primary object to provide a simply constructed and efficiently operating apparatus adapted to be arranged or interposed in a conduit for cleaning air or other gases passing therethrough and wherein means is provided for automatically removing the particles of dirt and other foreign materials collected by or accumulating upon the filtering medium so that the latter will be at all times maintained at its highest operating efficiency.

It is the primary object and purpose of my present improvements to provide such an apparatus embodying an endless series of articulated filter units or cells together with means for producing air tight joints between the adjacent cells.

It is also another important object of the invention to provide an effective barrier means carried by the several filter units to prevent the passage of air between the opposite side edges of the articulated series of units and the adjacent walls of the casing or housing in which said endless series of filter units are operatively mounted, and thereby causing all of the air of gases to pass through the filtering medium carried by said filter units or cells.

My invention is more particularly concerned with an apparatus of that character wherein a metallic filtering medium coated with a viscous solution is employed, and it is one of the objects of my present improvements to provide the apparatus with means whereby as the filtering medium is cleansed and the accumulated deposits thereon removed, the viscous coating upon the filtering medium is removed.

With the above and other objects in view, the invention consists in the improved filtering apparatus and in the form, construction and relative arrangement of its several parts as will be hereinafter more fully described, illustrated in the accompanying drawings, and subsequently incorporated in the subjoined claims.

In the drawings, wherein I have illustrated one simple and satisfactory embodiment of the invention, and in which similar reference characters designate corresponding parts throughout the several views,—

Fig. 2 is a side elevation of the apparatus with parts thereof broken away;

Fig. 3 is a front end elevation of the apparatus, which is opposed to the direction of travel of the dirty air;

Fig. 4 is a horizontal sectional view taken substantially on the line 4—4 of Fig. 1;

Fig. 5 is an enlarged fragmentary vertical section illustrating the flexible air tight joint connections the slidable joint connections between the filter units or cells and between said cells and the walls of the casing or housing;

Fig. 6 is a detail horizontal section taken on the line 6—6 of Fig. 5;

Fig. 7 is a detail fragmentary view substantially as indicated by the line 7—7 in Fig. 5, showing the manner of articulating the filter units or cells with each other;

Fig. 8 is a detail sectional view illustrating a modified means for effecting an air tight connection between the filter units or cells and the walls of the casing or housing;

Fig. 9 is a detail fragmentary end elevation of two of the filter cells showing a modified form of the flexible air tight joint between the same;

Fig. 10 is a diagrammatic sectional plan view showing a plurality of the endless articulated series of filter units as operatively arranged in a single conduit, and Fig. 11 is a detail view similar to Fig. 9 showing another modified form of the air tight joint connection between the adjacent cells.

Figure 1:
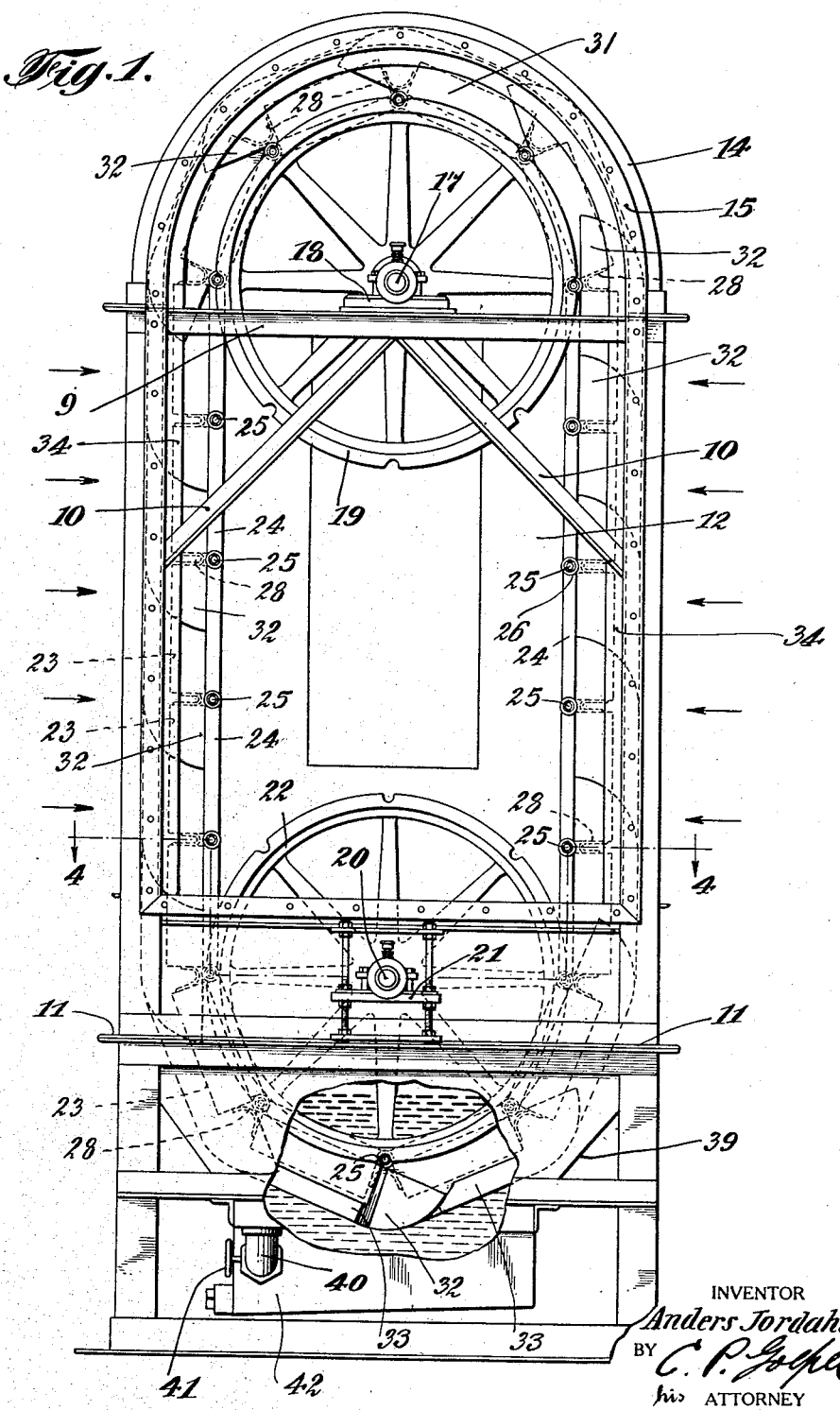
Figure 1 is a rear end elevation of the apparatus, or the clean air egress end thereof.

In the embodiment of the apparatus which I have selected for purposes of illustration, a frame or housing structure is provided which includes a base section 5, an intermediate section 6 and a top section 7. The intermediate section 6 of the housing is provided with corner uprights 8 of angular form in cross section. These uprights are connected at their upper ends by the horizontal beams 9, and if desired suitable bracing struts 10 may be provided between these beams and the uprights 8. The four uprights 8 are also connected at their lower ends by the angle bars 11 which are adapted to be riveted or otherwise secured upon the upper end of the base section 5 of the structure. One pair of uprights 8 at the front or ingress end of the apparatus are connected by a wall 12. The other or rear end of the structure between the uprights 8 is open for the egress of the clean air as will hereinafter appear and surrounding this outlet opening for the clean air, an angular sheet metal frame 13 may, if desired, be secured to the uprights 8. The top section 7 consists of the two curved angle bars 14 suitably secured upon the upper end of the intermediate section 6 of the structure and in effect forming continuations of the uprights 8, the angle bar 14 at the rear egress end having the projecting sheet metal frame 15 secured thereto which forms a continuation of the frame 13. The other angle bar 14 is provided with the vertical wall 16 which closes this upper end section 7 of the structure at the front end thereof.

At the upper end of the intermediate section 6 of the frame structure or housing the shaft 17 is journalled in suitable bearings 18 and upon the opposite ends of this shaft and in the plane of the uprights 8 the sprocket wheels 19 are securely fixed. A similar shaft 20 is journalled at its ends in bearings 21 at the lower end of the section 6 of the housing structure and has similar sprocket wheels 22 fixed on the ends thereof. As shown, suitable means may be provided for adjusting these lower bearings vertically to properly tension the endless filter chain to be presently described.

The filter units or cells generally indicated at 23 each consist of an elongated rectangular holder for a metallic filtering medium, said holder at opposite sides being open and having secured therein a retaining screen of reticulated material for the filtering medium. It will therefore, be understood that by the term "cell" or "filter cell" as used throughout this description and claims is meant a box-like structure having spaced foraminous side walls between which there is confined in a compact mass a suitable filtering medium or material presenting a multiplicity of baffle surfaces to the free flow of the air through said cell. To the end walls of each filter cell or unit the link bars 24 are welded, riveted or otherwise fixedly secured and project at their ends beyond the opposite sides of the filter cell, said projecting ends of the link bars being lapped upon each other as clearly shown in Fig. 7 of the drawings and apertured to receive the connecting pins or rods 25. In this manner, the filter cells are articulated or connected together in the form of an endless chain. The link pins 25 have rollers 26 loosely mounted on their opposite ends for engagement in the spaced recesses 27 in the peripheries of the sprocket wheels 19 and 22.

In order to prevent the passage of air inwardly between the articulated filter cells without passing through the filtering material contained therein, I provide flexible air tight joints between the adjacent filter cells. As herein shown, for this purpose, I may provide the flexible leather strips 28 extending longitudinally between the adjacent filter cells for the entire length thereof and having their opposite edges riveted or otherwise secured to the cell walls. Thus, these leather strips will preclude the passage of air inwardly between the adjacent filter cells without passing through the filtering material. As shown in Fig. 9 of the drawings, I may use as an alternative for the flexible leather strips 28 the thin plates of sheet steel indicated at 29 welded to the side walls of the filter cells and each having one edge outwardly bent and curved as at 30 to provide a longitudinally extending resilient lip having bearing pressure upon the periphery of the link pin 25. These yieldable lips will at all times exert a sufficient bearing pressure upon the link pins to provide an effective air tight seal between the same and the walls of the filter cells while at the same time they will permit of the relative movement of the filter cells as they pass around the sprockets 19 and 22.

In Fig. 11 of the drawings, I have shown a modified joint connection between the filter cells, in which a series of spaced plates 29' are spot welded to the cell walls and have one of their ends turned around the link rod or pin 25 to provide sleeves 30' closely encircling said pins and frictionally contacting therewith. These sleeves at their ends are closely engaged with each other but capable of free relative turning movement on the pin 25, and thus form a flexible air tight joint between the filter cells. It will be understood that these hinge sleeves subserve only this purpose, the strain or stress in the movement of the cell chain around the sprockets being sustained wholly by the link bars 24 and the connecting pins 25.

It is of course, also necessary to exclude the passage of the dirty air between the ends of the articulated filter cells and the adjacent walls of the housing or frame structure. For this purpose, I secure to each end wall of each of the filter cells a sheet metal plate 31, said plate at one of its ends having an angularly offset portion 32 extending beyond the end wall of the filter cell and having close frictional sliding contact upon the outer side of the opposite end of the plate 31 on an adjacent filter cell. Between the upper and lower sprocket wheels, when the filter cells are in alignment with each other, these projecting ends 32 of the plates 31 have their inner edges engaged upon the outer longitudinal edges of the link bars 24. As shown in Fig. 5 of the drawings, in passing around the sprockets, the projecting ends 32 of the plates 31 have a sliding movement relative to the plates with which they engage and move relative to the link bars, however, the inner edges of said end portions 32 of the plates never extend beyond the flexible joint members 28 between the adjacent filter cells. Therefore, it is impossible for the dirty air to pass laterally around the ends of the filter cells. Preferably, in order that the outer edges of the plates 31 may present an even thickness, I weld or otherwise secure to the outer side of each of said plates at its edge a metal strip 33 extending between the angularly offset overlapping ends of said plates, but which however, do not interfere with the free relative sliding movement of said plates.

As an additional precaution against the lateral entrance of the dirty air around the filter cells, I provide the inwardly projecting spaced guide plates 34 secured to the angle bars 8 and 14 of the housing structure and between which the outer edge portions of the plates 31 travel. Thus, it will be apparent that it is impossible for the dirty air to flow to the egress side of the apparatus without first passing through the filtering material contained in the endless articulated series of filter cells.

As an alternative for this feature of my invention, I may provide end walls or plates 34' between which the series of filter cells travel, having suitable packing strips 34ª of felt or other flexible material with which the ends of the several filter cells have sliding contact, as shown in Fig. 8 of the drawings.

Any convenient means may be provided for driving the endless chain of filter cells, such for instance as the motor 35 having a shaft connected by drive belt 36 with suitable speed reduction gearing 37 which is connected by the chain 38 with the shaft 17 of the upper sprocket wheels 19. The articulated series of filter cells may be operated either periodically or continuously, as circumstances may require.

In the lower base section 5 of the frame structure, a suitable tank 39 is mounted to receive a viscous material, such as a glycerin solution and the filter cells or units, as they pass around the lower sprocket wheels 22 are successively immersed in this solution so that the metallic filtering medium contained in said cells will become coated with the solution. At the same time, owing to the movement of the filter cells and the agitation of the solution, much of the accumulated foreign matter on the filtering medium will be washed therefrom and will settle in the tank 39. In furtherance of this purpose, I may if desired, provide means for heating the viscous solution, and also for agitating the same.

For the purpose of removing the foreign matter collecting in the tank 39, said tank at its bottom is connected by the pipe 40 having a suitable valve 41 interposed therein with a chamber 42 having a suitable screen 43 therein. Through this screen the solution is drawn by a suction pump 44 and returned to the upper end of the tank 39. Thus, the foreign matters collecting in tank 39 may be continuously removed therefrom and the solution contained in said tank maintained at all times in a clean condition. Also, it will be evident that by reason of the continuous discharge of the liquid into the tank from the pump 44, and the maintenance of a constant current flow of the body of liquid contained in this tank, that such liquid will permeate the filter cells under sufficient pressure to insure the contact of the liquid with practically all of the filtering material contained in the cell without interruption in the movement of the latter through the liquid. The thorough coating of these surfaces of the filtering medium with the viscous liquid is essential to the highest degree of efficiency in the operation of the apparatus, and the importance of this feature of the invention will be appreciated, since it is evident that if the liquid remained in a quiescent state except for such agitation as might be caused by the movement of the filter cell therethrough, such thorough coating of the baffle surfaces of the filtering medium could not be obtained during the relatively short period of time that the filter cell remains immersed in the solution.

In Fig. 10 of the drawings, I have illustrated a plurality of the endless articulated filter units arranged in a conduit 45 through which the dirty air or gas flows in the direction indicated by the arrows. It will be noted that the front end walls 12 opposed to the direction of flow of the dirty air separate the same into spaced streams which pass to the opposite sides of each apparatus and inwardly through the open sides of the travelling filter cells 23. Thus, all dirt and other foreign matter will be removed from the air or gas by the filtering medium contained in these cells. If desired or necessary, I may arrange over the rear, open or egress side of each apparatus a liquid collection screen 46 which prevents particles of liquid passing with the filtered air into the clean air section of the duct 45.

From the foregoing description considered in connection with the accompanying drawings, the construction, manner of operation and several advantages of the invention will be clearly understood. It will be seen that the essential feature of novelty in my present disclosure resides in the provision of an air or gas filtering apparatus of large capacity in which means is provided for effectually excluding the passage of unfiltered air or gas around the endless series of articulated cells or units without passing through the filtering material. A second important feature of the construction above described resides in the provision of means for automatically cleansing the filtering medium in the operation of the apparatus and renewing the coating of the viscous solution thereon whereby the apparatus is maintained at its maximum operating efficiency.

I have herein disclosed a practical example of apparatus for accomplishing the above purposes, but it is nevertheless, apparent that these essential features of my invention might also be exemplified in numerous other alternative structural forms, and I therefore, reserve the privilege of resorting to all such legitimate changes therein as may be fairly incorporated within the spirit and scope of the invention as claimed.

I claim:

1. In filter apparatus, a series of filter medium containing cells and means connecting the cells for movement as a unit, said cells having opposite open sides for the ingress and egress of air, and barrier means preventing the passage of air laterally around the respective filter cells.

2. In filter apparatus, a series of filter medium containing cells and means connecting the cells for movement as a unit, said cells having opposite open sides for the ingress and egress of air, and barrier means preventing the passage of air between the adjacent filter cells and laterally around the respective filter cells.

3. In filter apparatus, a series of filter medium containing cells, means linking the cells together for relative angular movement, said cells having opposite open sides for the ingress and egress of air, and barrier means preventing the passage of air laterally around the respective filter cells.

4. In filter apparatus, a series of filter medium containing cells, means linking the cells together for relative angular movement, said cells having opposite open sides for the ingress and egress of air, flexible joint members interposed between the adjacent cells and preventing the passage of air therebetween, and barrier means preventing the passage of air laterally around the respective filter cells.

5. In filter apparatus, an endless articulated series of filter medium containing cells having opposite open sides for the ingress and egress of air, means interposed between adjacent cells to prevent the passage of air therebetween, and additional barrier means preventing the passage of air laterally around the respective filter cells.

6. In filter apparatus, an endless articulated series of filter medium containing cells having opposite open sides for the ingress and egress of air, means interposed between adjacent cells to prevent the passage of air therebetween, and relatively movable coacting barrier members carried by the respective filter cells to prevent the passage of air laterally around said cells.

7. In filter apparatus, an endless articulated series of filter medium containing cells having opposite open sides for the ingress and egress of air, and relatively movable coacting barrier members carried by the respective cells to prevent the passage of air laterally around the cells.

8. In filter apparatus, a housing having an open end for the egress of clean air and open at its opposite sides for the ingress of dirty air, an endless articulated series of filter medium containing cells operatively mounted in the housing for movement past the open ingress sides thereof, slidable air tight joint connections between the filter cells and housing walls, and flexible barrier means carried by said filter cells causing the entering dirty air to flow solely through the filter cells to the interior of the housing.

9. In filter apparatus, a housing having an open end for the egress of clean air and open at its opposite sides for the ingress of dirty air, an endless articulated series of filter medium containing cells operatively mounted in the housing for movement past the open ingress sides thereof, and barrier means carried by said filter cells causing the entering dirty air to flow solely through the filter cells to the interior of the housing, said means including members carried by the respective filter cells and projecting beyond the ingress sides thereof, and relatively fixed means at opposite edges of the ingress openings in the side walls of the housing slidably engaged by said members.

10. In filter apparatus, a housing having an open end for the egress of clean air and open at its opposite sides for the ingress of dirty air, an endless articulated series of filter medium containing cells operatively mounted in the housing for movement past the open ingress sides thereof, and barrier means carried by said filter cells causing the entering dirty air to flow solely through the filter cells to the interior of the housing, said means including members carried by the respective filter cells and projecting beyond the ingress sides thereof, and guide channels at the opposite edges of the ingress openings in the side walls of the housing slidably receiving said barrier members on the filter cells.

11. In filter apparatus, a housing having an open end for the egress of clean air and ingress openings in its opposite sides for the dirty air, an endless articulated series of filter medium containing cells, supporting sprockets therefor mounted in the upper and lower ends of the housing, drive means connected with one of said sprockets, said cells moving past the ingress openings in opposite side walls of the housing, air tight flexible joint members between the adjacent filter cells, and cooperating barrier members on the filter cells and the side walls of the housing preventing the lateral flow of the incoming air around the respective filter cells.

12. In combination with an air or gas conduit, filter apparatus arranged therein comprising a plurality of endless articulated series of filter medium containing cells, said series of cells arranged in spaced relation to each other, a housing for each series of cells open at one end for the egress of clean air, said housing having opposite open sides for the ingress of dirty air and the series of filters moving in said housing in parallel relation with said open sides thereof, and barrier means associated with each series of filter cells to cause the flow of the dirty air to the interior of the housing through the open sides thereof only through the travelling filter cells.

13. In filter apparatus, in combination with a series of filter medium containing cells and means connecting the cells for movement as a unit, each filter cell containing a metallic filtering medium, means for moving said filter cells past an air ingress opening, and means for automatically coating the filtering medium in said cells during the movement of the latter with a viscous solution, and barrier means for preventing passage of the medium to be filtered except through the cells.

In testimony that I claim the foregoing as my invention, I have signed my name hereto.

ANDERS JORDAHL.